Sept. 30, 1969           F. B. SPROW           3,470,265

ALKYLATION WITH A FORWARD-DISCHARGING IMPELLER

Filed Dec. 5, 1966           2 Sheets-Sheet 1

INVENTOR.
FRANK B. SPROW.

BY

*Sylvester W. Brock, Jr.*

ATTORNEY.

United States Patent Office 3,470,265
Patented Sept. 30, 1969

3,470,265
ALKYLATION WITH A FORWARD-DISCHARGING IMPELLER
Frank B. Sprow, Baytown, Tex., assignor to Esso Research and Engineering Company
Filed Dec. 5, 1966, Ser. No. 599,290
Int. Cl. C07c *3/14, 3/54;* B01j *1/00*
U.S. Cl. 260—683.59                    3 Claims

ABSTRACT OF THE DISCLOSURE

A forward-discharging impeller provides improved mixing performance, particularly in sulfuric acid alkylation. By reversing the direction of rotation of an impeller having a pair of curved, tapered blades, as previously practised by the art, the average drop diameter is decreased and the homogeneity of drop size distribution is improved. Further, by tapering the blades in the axial plane, the efficiency of mixing is retained while the power consumption is cut in half.

---

The present invention relates to an improved impeller for use in mixing non-miscible fluids. More particularly, the present invention is directed to a novel impeller for use in mixing a sulfuric acid catalyst with hydrocarbon reactants. In its most specific aspect, the present invention relates to the use of a forward discharging, curved blade impeller, preferably having a tapered blade, in the mixing of sulfuric acid, olefin, and isobutane in an alkylation reaction.

In the chemical process industry, it is often necessary to create an emulsion of a hydrocarbon phase in an aqueous phase, wherein the formation of fine droplets for dispersion within the continuous phase is the essential function of a mixing impeller. Particularly, in the case of using a two-phase system wherein coalescence of the hydrocarbon phase rapidly occurs, the continual input of mixing energy is required so that the droplet size distribution within the emulsified zone can be maintained within desirable limits. Particularly in the alkylation of isoparaffinic hydrocarbons with olefins, which is carried out using a sulfuric acid catalyst, optimum operating conditioning require the formation of an emulsion with a very high interfacial surface area. The creation of this high interfacial area requires the continual input of a great amount of energy, mixing energies from 0.05 to 0.08 H.P. per cubic foot of emulsion being typical in some commercial alkylation reactors.

The present invention is directed to the development of and use of an impeller which will provide the same amount of effectiveness in the creation of dispersions of droplets of a desired size range with an energy input greatly lower than that previously required. The process of the present invention involves the use of an impeller similar to the flat, tapered impeller shown in U.S. Patent 3,111,305 but utilizing an impeller which is curved in a forward discharging direction.

All of this can be better understood by reference to the drawings wherein.

Figure 1:
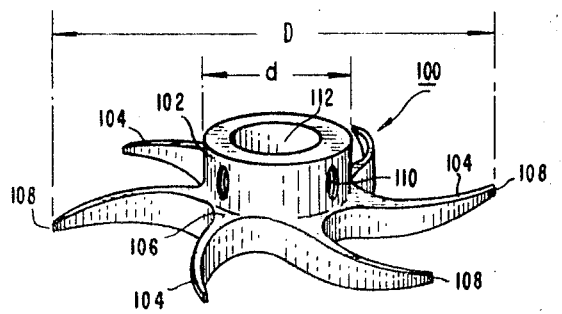
FIG. 1 is an isometric view of the improved impeller of the present invention.

Referring now to FIG. 1, the present invention is shown as comprising a novel impeller 100 having a hub 102 and a plurality of blades 104, the blades being shown in FIG. 1 comprising three pairs of diametrically opposed blades. The blades of the novel impeller are seen to include a hub portion 106 which has a width W and a tip portion 108 having a width $w$. The taper from hub to tip may be and preferably is made from both the upper and lower edge of the blade, but the taper can be on one side only. It is seen further that the impeller itself has a diameter D, and the hub portion has a diameter $d$. The hub portion is provided threaded means 110 for attaching the impeller to a shaft, the means 110 suitably comprising set screws. A passage 112 through the hub is provided for insertion of the shaft, and the set screws extend through the wall of the hub and into contact with the shaft when inserted. A plurality of set screws may be employed, preferably at least two being utilized.

Figure 2:
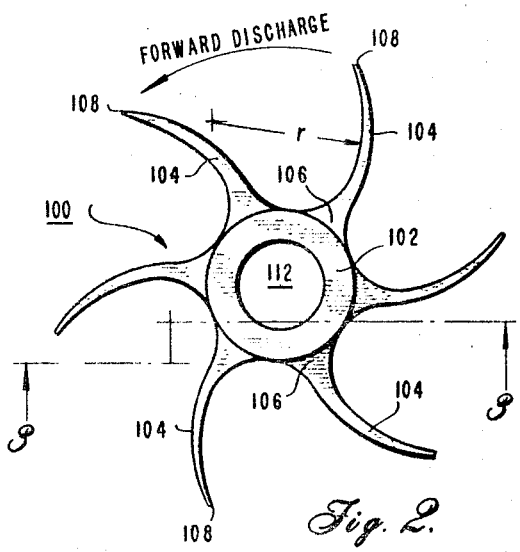
FIG. 2 is a plan view of the improved impeller of the present invention.

Referring now to FIG. 2, the impeller of the present invention is shown in plan view, the hub portion 102 being seen to include the passageway for insertion of the shaft and the set screws 110 for fixing the impeller to the shaft. The blades 104 are seen to have a forward rake, when considering rotation in the forward discharging direction. This forward rake is accomplished by curving the blades, the blade curve being represented by a radius of curvature $r$, which is preferably within the range from $D/2$ to D. As can be seen, the blades are provided in opposed pairs, three opposed pairs being preferred.

Figure 3:
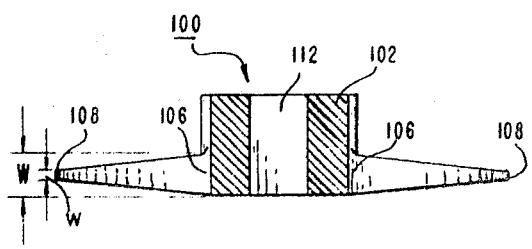
FIG. 3 is a sectional view taken along the line 3—3 of FIG. 2.

Referring now to FIG. 3, the impeller of the present invention is shown in elevation, with the blades 104 being attached as previously described to the hub 102. In FIG. 3, the blades are shown to be tapered both from the top and the bottom to a tip width $w$ from the hub width W. The ratio $w/W$ should range from 1/2 to 1/50, depending on the mixing requirements. Where the dispersed phase rapidly coalesces, the ratio $w/W$ will be high (e.g., 1/4 to 1/2). Where the dispersed phase does not rapidly coalesce, smaller ratios (e.g., 1/25 to 1/50) will be used. It is also to be realized that the taper may depend upon the exposed blade length, i.e., the amount of free blade length which is exposed:

$$\frac{D-d}{2}$$

The blade length would normally comprise from 0.25 to 0.45 of the propeller diameter.

Figure 4:
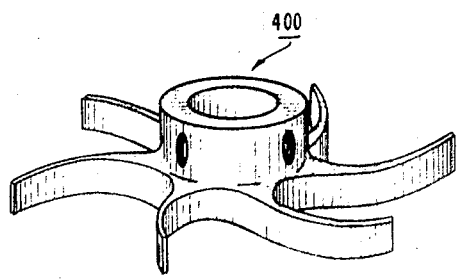
FIG. 4 is an isometric view of a prior art curved impeller.

FIG. 4 illustrates a commercially available prior art curved impeller 400. This impeller has no taper to the blade and (by the teachings of the prior art) is utilized in a rearward discharging direction. As will be discussed hereinafter, the advantages of a forward discharging direction of rotation for a particular mixing service in which the impeller is to be employed is based upon the efficiency of imparting mixing energy into a two-phase system.

Figure 5:
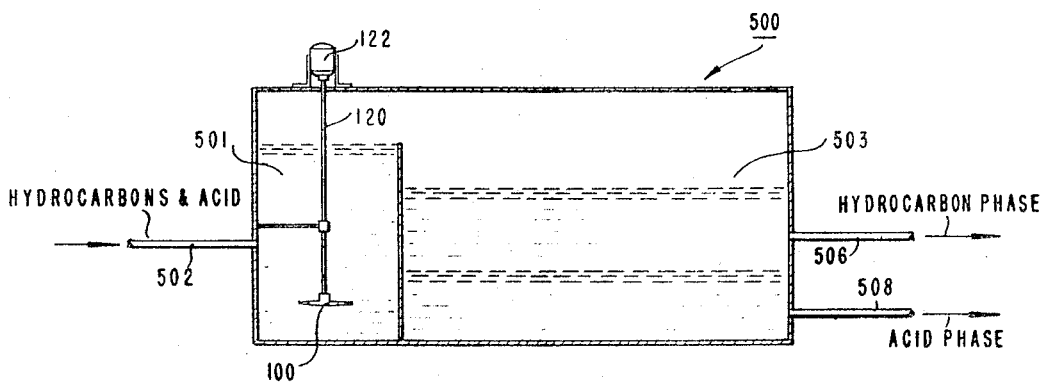
FIG. 5 is a schematic diagram showing the use of the present impeller in an alkylation reaction zone.

FIG. 5 illustrates schematically an alkylation reaction zone, wherein hydrocarbon and acid are introduced by way of line 502 at an acid-to-hydrocarbon ratio of about 1:1. The temperature within the alkylation zone 500 is maintained at about 35–65° F., and the emulsion is maintained within the reaction zone 501 for a time period of about 2 to 5 minutes, after which it is spilled over into the quiescent zone 503 for separation into a hydrocarbon phase removed by way of line 506 and an acid phase removed by way of line 508. In the alkylation zone 501, the impeller 100 of the present invention (or a non-tapered, curved impeller) is shown mounted on a shaft 120, located remotely from the inlet of line 502, and is rotated in a forwardly discharging direction by means of a prime mover 122, suitably an electric motor. As will be hereinafter discussed, the input of energy is more efficiently utilized by the present invention than by any of the prior art impellers heretofore used.

EXAMPLES

Example 1

In order to illustrate the advantages of the present invention, a number of experimental runs were made utilizing in the laboratory a scaled-down model of a commercial sulfuric acid alkylation reactor. A horizontal cylindrical tank filled with a mixture of half plant alkylate product and half plant black sulfuric acid was provided and maintained at 76° F. Various impellers were utilized at an impeller speed of 1000 revolutions per minute, and (using 2½ inch diameter impellers) the resulting impeller tip velocity was 11 feet/second.

Three types of impellers were employed. First was the conventional flat blade turbine impeller which is similar to that shown in FIG. 4, except that the blades are not curved but extend radially in diametrically opposed pairs. The second type was a conventional curved blade turbine shown in FIG. 4. Finally, a modified curved blade turbine impeller in accordance with the present invention was employed, with a tip width $w$ of $\frac{1}{16}$ in. In all cases the blade width at the hub was $\frac{5}{16}$ in., and the hub diameter $d$ was ¾ in.

Figure 6:
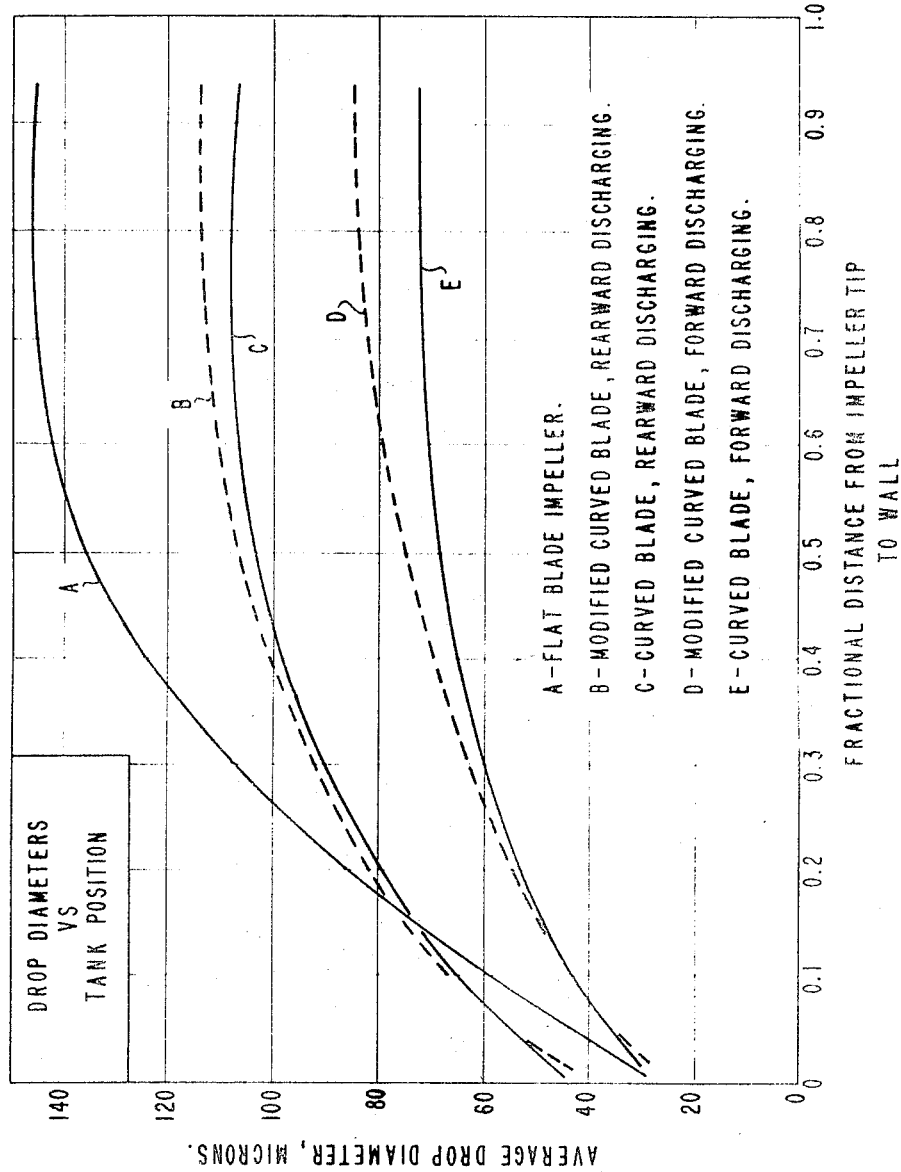
FIG. 6 is a set of curves illustrating the effectiveness of various impellers in maintaining drop diameters in a mixing zone.

The impellers were driven by an electrical motor, with power measurements being made to determine the amount of power being put into the system. At the same time, the average drop diameters of hydrocarbon particles were continuously determined at various points within the stirred zone, so that the particle size distribution from the impeller tip to the wall of the stirred zone could be determined. The curved blades were utilized in both the forward discharging direction and in the rearward discharging direction. The results are shown in FIG. 6. Note that the flat blade impeller (shown by curve A) shows a very wide range in the drop diameter, as the fractional distance from the impeller tip to the wall is increased. Near the wall, the drop size is about seven times as great as at the impeller tip.

In utilizing the rearward discharging curved blades, both of the prior art and of the present invention (curves B and C), a marked improvement is shown, the ratio of drop size being reduced to about 4:1.

Utilizing a forward discharging direction for both the curved impeller of the prior art and the modified curved-blade impeller of the present invention, a substantial improvement was shown. Note that the curved blade impeller of the prior art, when used in the forward discharging direction, is only slightly superior to the modified blade of the present invention in maintaining a relatively good distribution of drop diameters. From the practical standpoint, the two blades are essentially equivalent. As will be seen hereinafter, however, the power requirements to maintain essentially the same performance are radically different.

The "power number" is a measure of the energy being put into an impeller. In a given service, the efficiency of an impeller can be measured by a comparison of the power number of the impellers at relatively identical effectiveness. Thus, the power number for the impellers under the condition pairs shown by curves B and C and by curves D and E should give an indication of the overall efficiency in the designated service.

The power number is given by the equation:

$$N_p = \frac{17,710 \times \text{H.P.}}{\rho N^3 \times D^5}$$

where H.P. is the horsepower input to the impeller, $\rho$ is the fluid density in pounds per cubic foot, N is the impeller speed in revolutions per second, and D is the impeller diameter in feet. Using the power number equation, the performance of the various impellers is compared below.

TABLE I

| Impeller: | Power number |
|---|---|
| Conventional flat blade turbine (curve A) | 3.25 |
| Conventional curved blade turbine, rearward discharging (curve B) | 2.04 |
| Modified curved blade turbine, rearward discharging (curve C) | 1.01 |
| Conventional curved blade turbine, forward discharging (curve E) | 2.10 |
| Modified curved blade turbine, forward discharging (curve D) | 0.98 |

Referring to Table I, it is immediately obvious that the modified blade of the present invention had a power number of only 1.01 as compared to 2.04 for the conventional curved blade turbine, a saving of over one-half of the required power to do the same work. Similarly, when using a forward discharging direction, the present impeller utilized a power number of only 0.98 as compared to 2.10 for the conventional curved blade turbine—again, a saving of one-half in the power required to perform essentially the same work.

Example 2

In order to illustrate the performance of the novel impeller in a dispersion having strong coalescence effects, a mixture was prepared of methyl isobutyl ketone (MIBK) and 1% NaCl in water. There was 25 volume percent MIBK in the mixture of liquids. The interfacial tension was 9.3 dynes/cm., providing a strongly coalescing system.

The mixture was placed in a vessel having an inside diameter of 8¾ inches. A variety of impeller types was employed, but the impeller diameter was maintained constant at 3 inches, and the width ratio $W/D$ was constant at 1/8. A constant tip velocity of 11 feet/second was used. The drop diameter was measured at several positions: (1) adjacent the impeller tip; (2) below the tip, adjacent the vessel bottom; (3) above the tip, midway to the liquid surface; and (4) above the tip, adjacent the liquid surface. The results are shown below.

TABLE II

| Impeller | Drop diameter, microns | | | | Maximum ratio |
|---|---|---|---|---|---|
| | (1) | (1) | (3) | (4) | |
| Flat | 123 | 189 | 133 | 161 | 1.54 |
| Curved, rearward discharging | 124 | 177 | 134 | 155 | 1.43 |
| Curved, forward discharging | 109 | 141 | 115 | 136 | 1.29 |

Note that the absolute particle sizes are much smaller at each location when the forward-discharging curved impeller is used. Of equal significance is the maximum ratio of particle diameters, a measure of the ability of the impeller to maintain a relatively homogeneous dispersion. Note that ratio of the largest diameter ($141\mu$) to the smallest diameter ($109\mu$) is only 1.29 when using the forward-discharging curved impeller of the present invention, compared to 1.43 for the rearward-discharging curved impeller and to 1.54 for the flat impeller. Thus, it is seen that a strongly coalescing system can be better maintained in dispersion when using the process of the present invention.

It is thus apparent that the impeller of the present invention provides an unobvious improvement in the field of mixing impellers, and what is to be covered by Letters Patent should be limited not by the specific examples herein given, but should include those equivalents which will be obvious to those skilled in the art.

I claim:

1. In the alkylation process wherein an olefin and an isoparaffin are reacted in a mixing zone in contact with an aqueous sulfuric acid catalyst,
said olefin and isoparaffin comprising the hydrocarbon phase and said aqueous sulfuric acid comprising an aqueous phase, and wherein said hydrocarbon phase is dispersed within said aqueous phase by the action of an unconfined rotating impeller mounted within said zone at a substantial distance from the olefin and isoparaffin inlets to said zone, under reaction conditions including an emulsion residence time of about 2 to about 5 minutes within said mixing zone, The improvement of using as said rotating impeller a forward-discharging impeller having at least one pair of curved, tapered blades, wherein the length of the blade is from 0.25 to 0.45 of the impeller diameter.

2. A process in accordance with claim 1 wherein the impeller blades are tapered in the axial plane, and the $w/W$ ratio is within the range from 1/2 to 1/50.

3. A process in accordance with claim 2 wherein the impeller has a tip speed of about 11 feet per second.

References Cited

UNITED STATES PATENTS

| | | | |
|---|---|---|---|
| 1,829,812 | 11/1931 | Rose | 23—285 |
| 2,428,411 | 10/1947 | Davis. | |
| 2,747,003 | 5/1956 | Kilpatrick | 23—285 |
| 3,047,368 | 7/1962 | Marco | 23—285 |
| 3,053,917 | 9/1962 | Bergougnou | 260—683.59 |
| 2,459,636 | 1/1949 | Fenney | 260—683.4 |

DELBERT E. GANTZ, Primary Examiner

G. J. CRASANAKIS, Assistant Examiner

U.S. Cl. X.R.

23—285, 288